United States Patent
Odgers et al.

(10) Patent No.: US 7,308,430 B2
(45) Date of Patent: Dec. 11, 2007

(54) METHODS AND APPARATUS FOR UNIQUELY IDENTIFYING A LARGE NUMBER OF FILM PRINTS

(75) Inventors: Chris R. Odgers, Claremont, CA (US); Alan Bell, San Marino, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 1415 days.

(21) Appl. No.: 10/115,335

(22) Filed: Apr. 2, 2002

(65) Prior Publication Data

US 2003/0187674 A1    Oct. 2, 2003

(51) Int. Cl.
*H04K 1/00* (2006.01)
(52) U.S. Cl. .................. 705/57; 705/1; 705/58
(58) Field of Classification Search ............. None
See application file for complete search history.

(56) References Cited

U.S. PATENT DOCUMENTS 5,862,260 A    1/1999   Rhoads
6,314,409 B2*  11/2001  Schneck et al. ............. 705/54

FOREIGN PATENT DOCUMENTS

| WO | WO 99/62022 | 2/1999 |
| WO | WO 02/29510 | 4/2002 |
| WO | WO 02/19589 | 7/2002 |

* cited by examiner

*Primary Examiner*—Michael J. Fisher
(74) *Attorney, Agent, or Firm*—Gottlieb, Rackman & Reisman, P.C.

(57) ABSTRACT

A method and apparatus for generating many uniquely identifiable media copies from a few uniquely marked masters to reduce the expense of subjecting each media copy to a marking process while maintaining the ability to trace unauthorized copies back to an authorized source. A number of masters of a film or media presentation are digitally or optically marked with identifiers to distinguish each master from each other master. The identifiers provide the ability to distinguish corresponding partitions or segments among masters. The masters with their identifiers are then duplicated. Final media prints are then assembled by combining segments with the duplicated identifiers from various masters in a manner to form segments with unique identifier sequences. Thus, each final print may be distinguished from each other final print by their identifier sequences.

20 Claims, 4 Drawing Sheets

US 7,308,430 B2

METHODS AND APPARATUS FOR UNIQUELY IDENTIFYING A LARGE NUMBER OF FILM PRINTS

FIELD OF THE INVENTION

The invention relates to the field of methods and apparatus for tracing unauthorized duplication of media assets. More specifically, the invention involves methods and apparatus for duplicating media in a manner to allow each copy to be uniquely identified so that the source of an unauthorized copy can be determined.

BACKGROUND OF THE INVENTION

Media piracy is the source of a substantial loss of revenue for content creators in the entertainment field. The Motion Picture Association of America (MPAA) estimates that losses due to piracy worldwide for the U.S. motion picture industry may exceed $3 billion on an annual basis. In order to combat the problem of media piracy, it would be useful if there was a way of uniquely identifying each authorized copy of the media in such a way that any unauthorized copy could be traced back to the authorized copy from which it was made. Unfortunately, the process for the high speed, mass duplication of certain types of media, such as film, does not lend itself to the production of hundreds or thousands of unique copies.

A prior method for marking film prints to facilitate forensic identification exists, and was developed by the Motion Picture Association of America and Kodak employees approximately 15 years ago. This technique was known as "Capcoding." It involved placing visible dots into a spatial matrix on a film frame. Various combinations of the dots/matrix provided approximately 1000 unique codes. The dot matrix was printed onto a release print utilizing a 35 mm slide that had the dot pattern on it. The pattern was printed onto the film at regular intervals. As each print was printed a different 35 mm slide with a different code on it would drop into place.

One problem with this method is that there is no correlation of the dots with scene density/content, so it is possible that some of the dots are not visible, which could result in a misreading of the code. It is also difficult to discern the dots if the (pirated) copy is of poor quality. A further problem is that the 35 mm slides used to print the code are subject to wear and damage, and that the system as designed is limited to approximately 1000 unique codes. As a result of these deficiencies, the Capcode process has not proven popular, although it continues to have some low level of use.

While it is technologically possible to electronically insert a unique identifier, such as a watermark, into a piece of digital media, this must be done N times over to create N uniquely identifiable pieces of media. A number of commercial companies have demonstrated such systems, including IBM, Matsushita Electric, and Digimarc. To add such a mark to a film, the film must first be digitized, the mark inserted, and the digitized film with the added watermark recorded back to film if it is to be projected. This is an expensive and time consuming process, especially considering that it may be necessary to make thousands of uniquely identifiable copies of the media.

It is an object of the present invention to provide a method for forming unique copies of media assets for subsequent identification.

It is a further object to provide such a method while minimizing the cost and time associated with marking in the duplication process to permit efficient mass production of a media asset.

BRIEF DESCRIPTION OF THE INVENTION

The present invention is a novel method for piracy deterrence based upon the presence of distinctive identification marks on all authorized copies of an original work or print so that the source of an illegal copy can be traced back to the authorized copy. The method avoids the prior need for subjecting each and every duplicate of a master print to a marking process while still maintaining the ability to uniquely distinguish each duplicate by a unique identifier on the copies. In other words, the method permits mass production of uniquely identifiable media copies or prints by only uniquely marking a small number of duplicates of the original work.

In general, the method starts with several master prints of a motion picture or other entertainment or presentation content. The master prints are marked with unique identifiers. In addition, these marked master prints are partitioned into comparable segments. Each segment include an identifier so that the segments from one master can be distinguished from the segments of the other masters. Copies are made from these segmented master prints. Final prints are then assembled by uniquely combining segments taken from one or more of the master prints such that each final print has a unique sequence of segment identifiers. In this way, the final prints maintain the entertainment content of the original work and can be mass produced in a distinguishable manner as a result of different combinations of segment identifiers. The method may be accomplished using digital methods and digital mediums as well as using visual methods and analog media such as film.

BRIEF DESCRIPTION OF THE DRAWINGS

The method as more specifically described below is illustrated in the following figures.

DETAILED DESCRIPTION OF THE INVENTION

The production of many uniquely identifiable media copies from only a few different master copies relies on placing marks on the media, and upon the combinatorial nature of an assembly of a complete media from media partitions or a number of segments. Given M uniquely marked copies of the full media asset (such as a movie), where the media asset is divided into S segments, it is possible to create $M^S$ uniquely identifiable versions (i.e. distribution media copies) of the media asset as described in more detail below.

Figure 1:
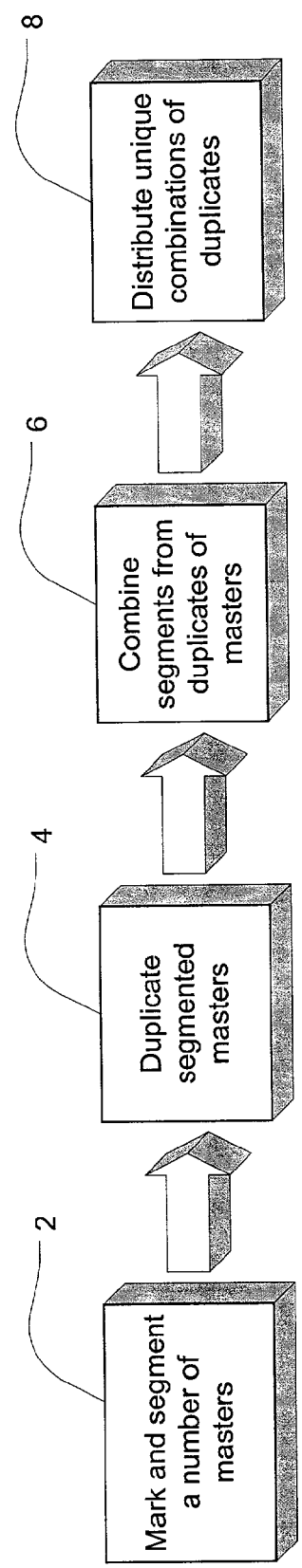
FIG. 1 is a flow chart illustrating the general steps in the method of the invention.

Referring to FIG. 1, the method for producing many unique copies of an original work by marking only a small number of masters initially involves a marking step 2. In general, the masters are duplicates of an original work with a common presentation content. During this step, the masters are marked with a unique identifier. The scope of the marking must be sufficient to permit a distinction between segments or partitions of one master from the corresponding segments or partitions of the other masters. The partitions or segments are chosen in a common fashion relative to all masters so that one segment of one master has a corresponding segment in each other master. With such common partitioning or segmenting, a segment from one master can be replaced by a segment from another master without substantially changing the presentation content of the original work. Thus, with its identifier in all of the segments, each master is distinguishable from all other masters.

It is preferred that the marks be not visually objectionable. Moreover, they must be robust enough to be readable in an unauthorized copy. To these ends, the identifying marks may be visible or invisible. Such a visible mark or identifier might be applied optically in the spatial domain, for example, by including some visual element in the entertainment content of the presentation media that can be distinguished from another version of that content. To this end, the visual element in the case of a film may be the particular color or type of a car that appears in a scene common to each of the masters. In this example, the differences in the car as compared to the other masters would serve as part of the identifier. Other visual marks, such as the dots or marks of a Capcoding or similar process might also be used.

Alternatively, the identifier might be applied electronically in the digital domain. In the case of film, the film could be digitized and an invisible mark could be created by adding a digital watermark to the digital intermediary and then printing the watermarked digital intermediary back to film. Such methods are known in the art.

In a duplicating step 4, all of the marked masters are then duplicated using an appropriate duplication process. Each duplicate need not be subjected to a new marking process. However, the intermediate copies resulting from this duplication process should maintain the identifiers of the masters from which the copies are made. Thus, the intermediate copies have duplicated the unique identifiers. The copying process will result in a set of intermediate copies for each master version. Each intermediate copy in one set would not generally be distinguishable from the intermediate copies because of the duplicated identifier in that set, but each copy in one set would be distinguishable from the copies of the other sets. In this step, no more than $M^S/M$ copies of each master should be made. This number of intermediate copies is sufficient to maximize the number of unique final or distribution copies that could be generated. Since the total possible number of unique distributable copies is $M^S$ (M=number of masters and S=number of segments) $M^{S-1}$ are all that is needed for each master. Any more copies will result in unnecessary intermediate media copies because if they are used, the resulting media copies would not be distinguishable from other distributable copies. Of course, fewer copies can be made.

In a combining step 6, the invention utilizes the marked and segmented sets of intermediate copies to generate final or distributable media copies that are uniquely distinguishable from each other despite the fact that only a relatively small number of masters were uniquely marked in the first instance. As previously noted, each master is segmented or partitioned. In this combining step 6, segments from the duplicated sets are assembled in a combinatorial fashion. The goal of the step is to combine the segments so that each resulting or assembled copy has all of the partitions or segments that constitute the whole entertainment or presentation content common to all of the masters. However, by using different combinations of segments or partitions from various masters, a unique identifier sequence exists in each assembled or distribution copy such that it can be distinguished from all other assembled copies. This is true even though the segments have duplicated identifiers, copied from the uniquely marked masters.

In distributing step 8, these final uniquely distinguishable combined or assembled copies of the original work may then be mass distributed as authorized copies. To enable the tracking of the authorized copies, the identifier sequence of each final copy should be recorded and associated with the authorized recipient so that a later discovered unauthorized copy can be traced back to the authorized recipient by the identifiers on the unauthorized copy.

With the invention described, it is only necessary to produce a very small number of uniquely marked media masters in order to produce a very large number of uniquely identifiable distribution media copies. In an example of a master partitioned into six segments, the problem of producing 46,656 uniquely identifiable complete final copies has been reduced by four orders of magnitude (to that of producing only six uniquely marked copies of the master). The table below further illustrates the power of this technique:

Table of the Number of Uniquely Identifiable Copies Producible

| Number of Uniquely Marked Media Masters | Number of Segments | | | | | | |
|---|---|---|---|---|---|---|---|
| | 1 | 2 | 3 | 4 | 5 | 6 | 7 |
| 1 | 1 | 1 | 1 | 1 | 1 | 1 | 1 |
| 2 | 2 | 4 | 64 | 16 | 32 | 64 | 128 |
| 3 | 3 | 9 | 27 | 81 | 243 | 729 | 2187 |
| 4 | 4 | 16 | 64 | 256 | 1024 | 4096 | 16384 |
| 5 | 5 | 25 | 125 | 625 | 3125 | 15625 | 78125 |
| 6 | 6 | 36 | 216 | 1296 | 7776 | 46656 | 279936 |
| 7 | 7 | 49 | 343 | 2401 | 16807 | 117649 | 823543 |
| 8 | 8 | 64 | 512 | 4096 | 32768 | 262144 | 2097152 |

Figure 2:
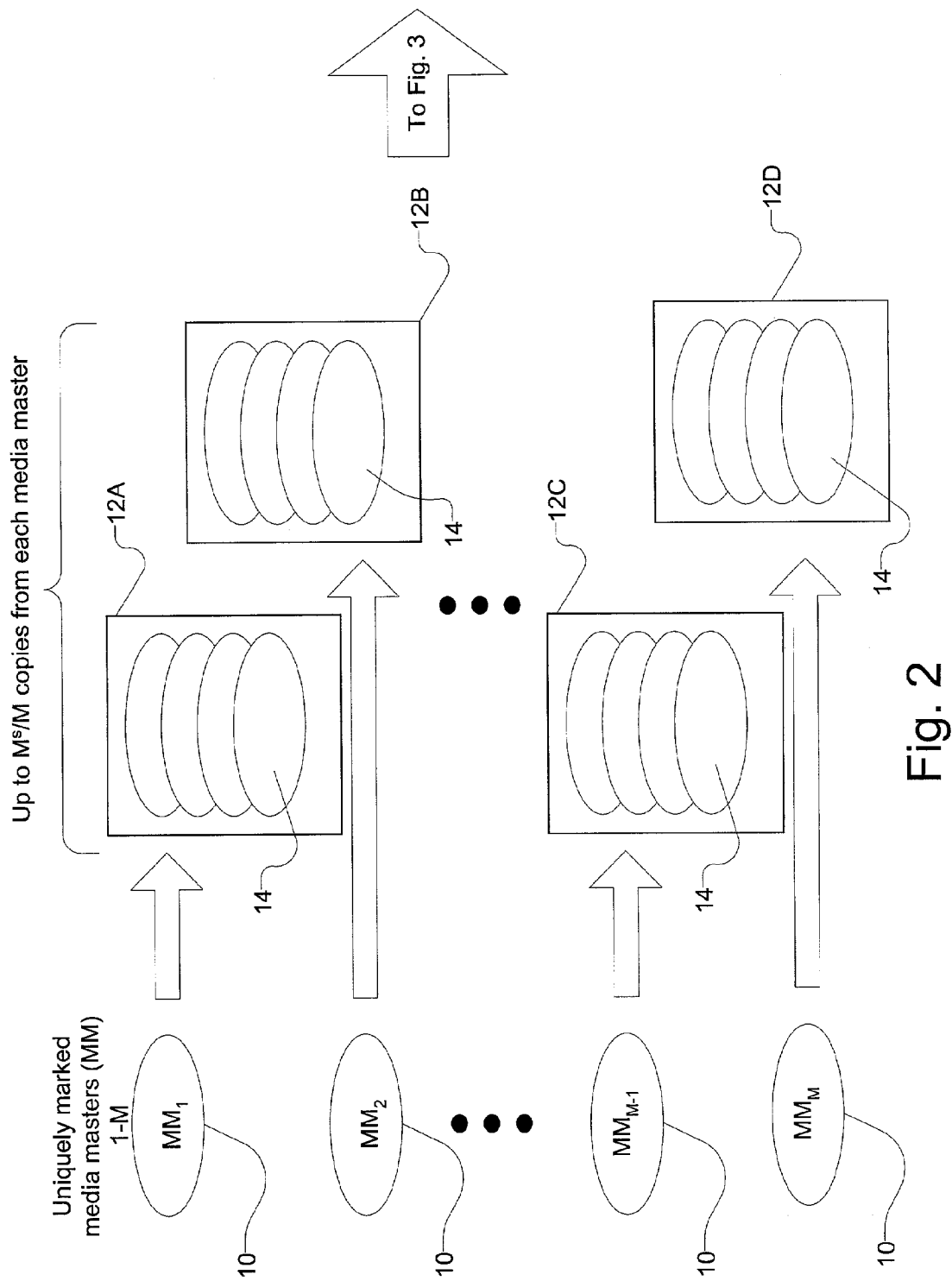
FIG. 2 illustrates some steps in a preferred method for marking and duplicating film prints using the method of FIG. 1.
Figure 3:
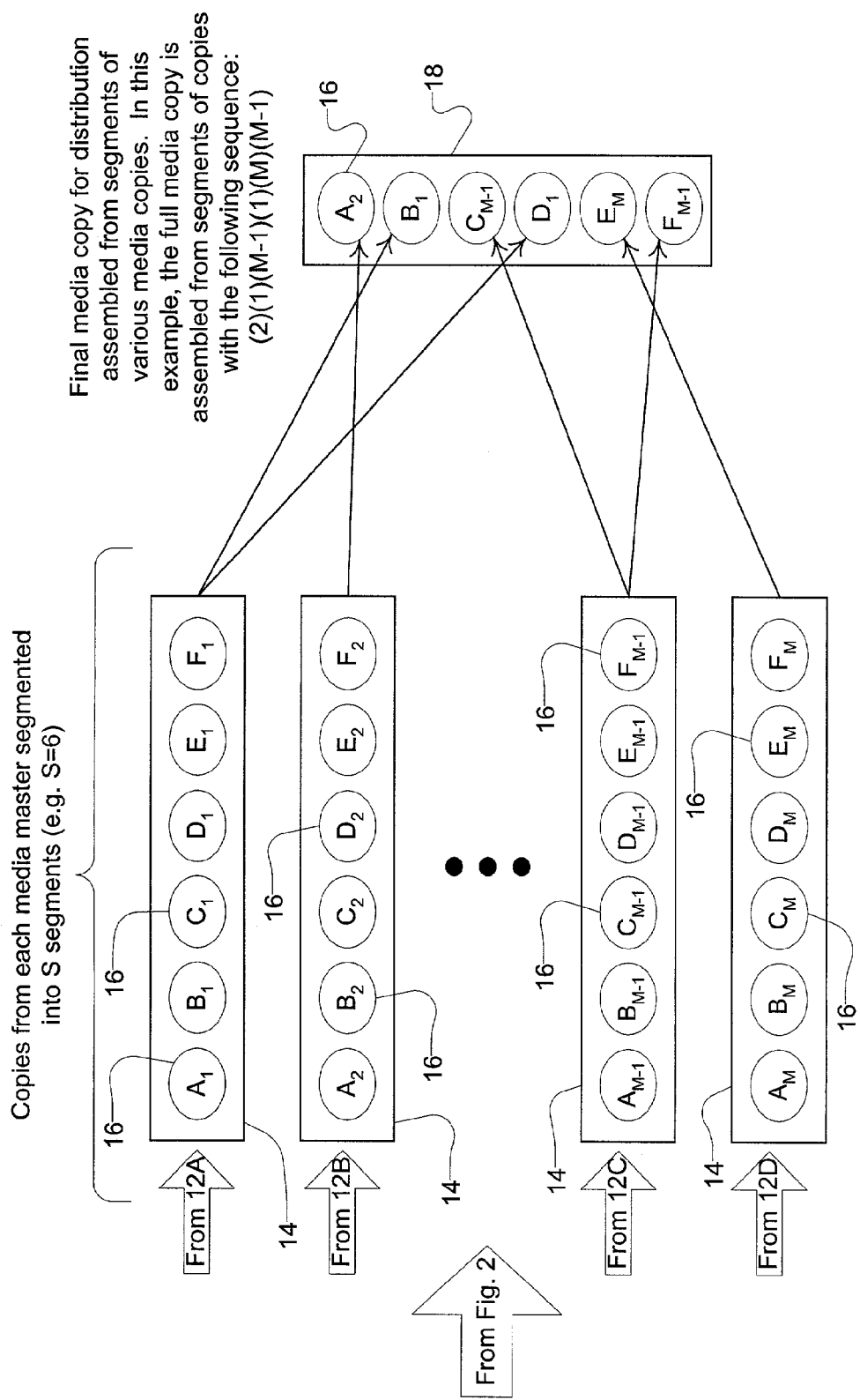
FIG. 3 depicts the remaining steps of the method of FIG. 2.

The details of the invention are further illustrated in the following example involving the distribution of movie films. With reference to FIGS. 2 and 3, a movie that was made up of six sequential reels (S=6) could be produced in six uniquely marked master versions (M=6). Each uniquely marked master version 10 of the film would be produced in such a way that when the film is subdivided into segments 16 (reels), each segment 16 would still contain the unique mark. For example, all the reels which make up the first set 12A of intermediate copies 14 of the first market version (shown as $MM_1$ in FIG. 2) might be encoded with the value "1" (shown as $A_1 \ldots F_1$ in FIG. 3), all the reels which make up the second set 12B of intermediate copies 14 from the second marked version (shown as $MM_2$ in FIG. 2) might be encoded with the value "2" (shown as $A_2 \ldots F_2$ in FIG. 3), and so on. Each final full distribution print or final copy 18 of the film would be re-assembled from segments 16 in such a way that the sequence of the marks contained in the combined reels would constitute an identifier for the entire film (e. g. 2-1-5-1-6-5) (shown as $A_2$-$B_1$-$C_{M-1}$-$D_1$-$E_M$-$F_{M-1}$ in FIG. 3), and each full print would be identified by a unique identifier sequence. By using each possible identifier sequence only once, a unique identifier, or serial number, for the film is created. Segment numbers representative of or associated with the actual identifier could be printed on the media in an easy-to-read form to facilitate identification of each segment for the assembly process.

For the six reel film example, with six unique master versions, $6^6$, or 46,656 uniquely identifiable finished versions of the film could be produced. The six uniquely marked copies of the film could be mass duplicated by standard procedures, and the unique reel sequences assembled prior to distribution.

For distribution of multiple copies to a single exhibitor, care would have to be taken to ensure that S minus 1 segments of all copies of the film provided to the exhibitor are marked identically, with only one segment marked differently. This would ensure that if the exhibitor interchanged segments (reels) of the film, they would not generate an identification sequence that had been sent to another exhibitor. For example, three copies of a six reel film sent to an exhibitor might be identified 2-1-5-1-6-3, 2-1-5-1-6-4, and 2-1-5-1-6-5. Interchanging any of the reels could only result in a sequence beginning with 2-1-5-1-6 and so could not produce a numeric identification sequence which had not originally been provided to the exhibitor.

The mark detection process on pirated copies of the distribution copies or prints would be performed either by inspection, in the case of optical marks, or by an electronic system, in the case of digital watermarks. If a record by serial number associated with the identifier sequence was kept of the location that originally exhibited each media copy, it would be possible to determine the source from which an unauthorized copy was made.

While the above example is based on film media that are traditionally projected, the technique is also applicable to media that remains in the digital domain, i.e., for distribution on digital cinema systems. To this end, replication of final copies need not rely upon a strict separation between the duplication step 4 and the combining step 6. Thus, the copying of a unique set of segments 16 from masters 10 for assembly of a final distribution copy 18 may be performed substantially contemporaneously.

Figure 4:
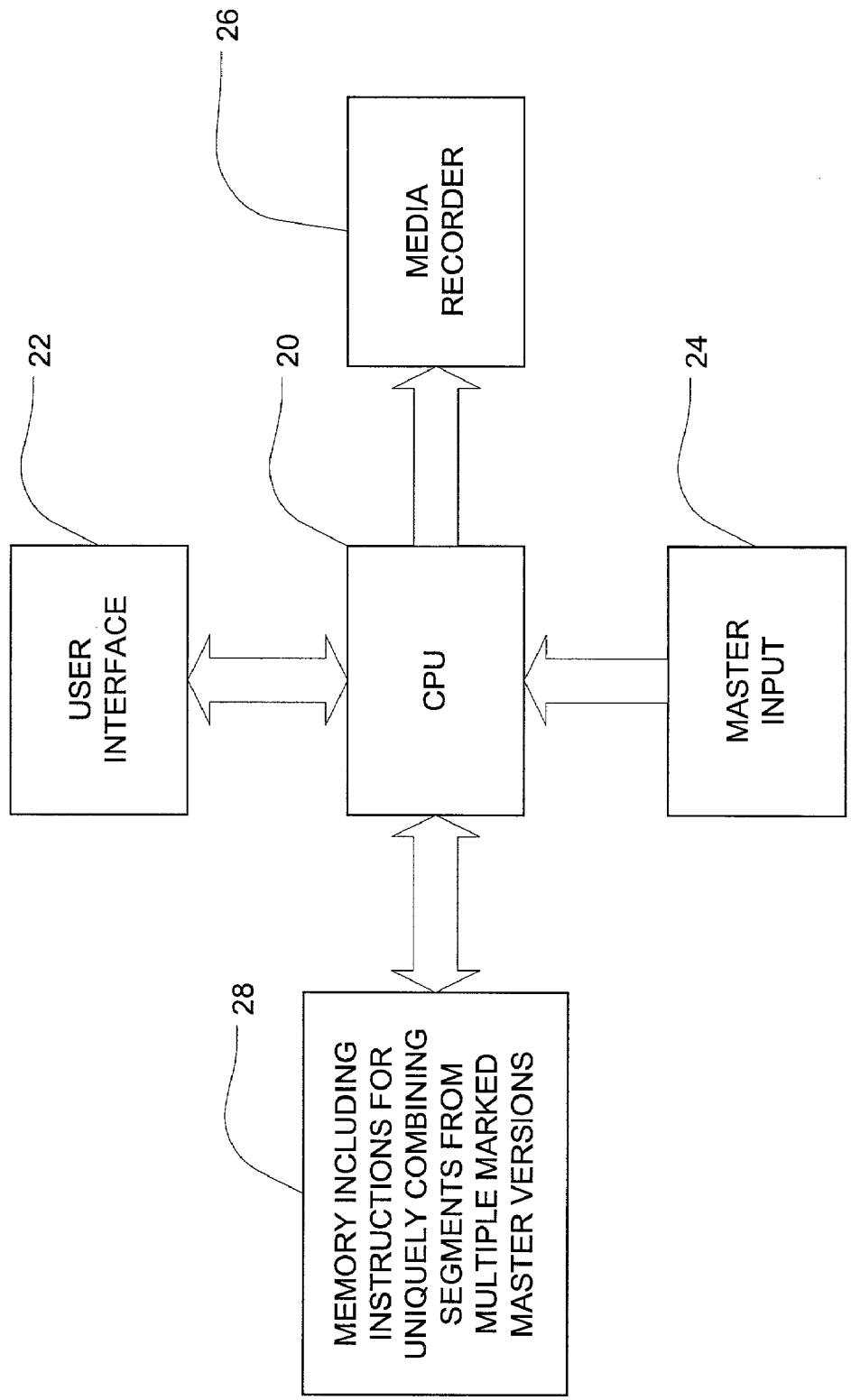
FIG. 4 shows an apparatus for implementing one embodiment of the method of the invention.

An apparatus or system as illustrated in FIG. 4 may be programmed to accomplish the above described invention. The apparatus includes a central processing unit (CPU) 20, a user interface 22 or other input/output devices, master media input 24, a media recorder 26, and a memory 28. The memory has programmed instructions or software for the CPU to control the duplication method where one or more masters 10 are loaded into the system via the master media input 24. These masters may be marked in the system or pre-marked by another system. If a single master is loaded, uniquely marked masters may be generated using the CPU 20. The CPU 20 in response to commands from the user interface 22 then controls the media recorder 26, for example, a DVD writer or other recording device, to generate final copies of the masters from the master media input 24 or the memory 28 in a manner to uniquely combine segments as previously described from the uniquely marked masters while preserving the overall presentation content. The CPU 20 in accordance with instructions from the memory 28 would store or keep track of each used segment sequence from the final copies to avoid generating final copies with a particular segment sequence more than once.

Although the invention has been described with reference to particular forms, it is to be understood that these are merely illustrative of an application of the principles of the invention. Numerous modifications, may be made and other arrangements may be devised without departing from the spirit and scope of the invention.

The invention claimed is:
1. A method of making media prints that permits the prints to be uniquely identified comprising the steps of:
   marking a plurality of master prints having a common presentation content
   partitioning each master print into a finite number of segments and assigning a unique segment identifier to each segment such that (a) each segment of each master has a corresponding segment in each other master, and (b) each segment of each master is distinguished from the corresponding segments in the other masters;
   making a plurality of copies of each of said masters; and
   forming a plurality of distribution prints by combining segments of copies of different master prints such that each distribution print is uniquely distinguished by the segment identifiers of its segments.

2. The method of claim 1 wherein each print of said plurality of prints is a film print.

3. The method of claim 2 wherein said unique identifiers are applied optically.

4. The method of claim 3 wherein at least one of said plurality of distribution prints has combined segments that are formed from copies of all of said master prints.

5. The method of claim 4 wherein said segments are reels.

6. The method of claim 5 further comprising the step of distributing no more than a number of said distribution prints equal to a total number of master prints raised to an exponent of said number of segments.

7. The method of claim 1 wherein said prints include prints on a digital recording medium.

8. The method of claim 7 wherein said identifier is a digital watermark.

9. The method of claim 8 wherein said forming step and said making step are performed substantially contemporaneously.

10. The method of claim 9 wherein at least one of said plurality of prints has combined segments that are formed from copies of all of said master prints.

11. The method of claim 10 further comprising the step of distributing no more than a number of said distribution prints equal to a total number of master prints raised to an exponent of said number of segments.

12. A method of generating uniquely identifiable media copies from an original work formed of a plurality of seguential segments comprising the steps of:
   making a plurality of master copies, each consisting of a plurality of corresponding master segments;
   marking said master segments with unique identifiers;
   making duplicate segments of said master segments;
   assembling duplicate segments from different masters to form assembled copies of said original work wherein said assembled copies have different identifier sequences formed of the respective segment identifiers.

13. The method of claim 12 further comprising the step of: distributing a number of said assembled copies that is (a) greater than a total number of said master copies and (b) no more than a maximum number equal to said total number raised to an exponent of a total number of said segments.

14. The method of claim 13 wherein said assembled copies are movie films.

15. The method of claim 14 wherein said identifiers are applied optically.

16. The method of claim 15 wherein said segments are reels.

17. The method of claim 12 where in said marking step a digital identifier is applied to each master copy.

18. The method of claim 17 wherein some of said assembled copies are assembled from duplicated segments from all of said master copies.

19. The method of claim 18 further comprising the step of distributing a number of said assembled copies that is (a) greater than a total number of said master copies and (b) no more than a maximum number equal to said total number raised to an exponent of a total number of said segments.

20. The method of claim 1 wherein the number of distribution copies is greater then the number of masters.

* * * * *